(12) United States Patent
Nitta et al.

(10) Patent No.: US 8,612,653 B2
(45) Date of Patent: Dec. 17, 2013

(54) INFORMATION PROCESSING APPARATUS AND METHOD, AND COMPUTER PROGRAM THEREFOR

(75) Inventors: Kenichiro Nitta, Chiba (JP); Tatsuhito Tabuchi, Chiba (JP)

(73) Assignee: Sony Corporation, Tokyo (JP)

( * ) Notice: Subject to any disclaimer, the term of this patent is extended or adjusted under 35 U.S.C. 154(b) by 240 days.

(21) Appl. No.: 11/555,877

(22) Filed: Nov. 2, 2006

(65) Prior Publication Data

US 2007/0162949 A1  Jul. 12, 2007

(30) Foreign Application Priority Data

Dec. 27, 2005  (JP) .................................. 2005-375156

(51) Int. Cl.
*G06F 13/12* (2006.01)
*G06F 13/38* (2006.01)

(52) U.S. Cl.
USPC ........................................................... 710/74

(58) Field of Classification Search
None
See application file for complete search history.

(56) References Cited

U.S. PATENT DOCUMENTS

| | | | |
|---|---|---|---|
| 5,986,700 A | 11/1999 | Wakui | |
| 6,148,354 A * | 11/2000 | Ban et al. | 710/301 |
| 6,288,800 B1 * | 9/2001 | Izumi | 358/468 |
| 6,356,178 B1 * | 3/2002 | Isozaki | 386/109 |
| 6,529,236 B1 * | 3/2003 | Watanabe | 348/230.1 |
| 6,603,744 B2 * | 8/2003 | Mizutani et al. | 370/310 |
| 6,608,650 B1 * | 8/2003 | Torres et al. | 348/333.02 |
| 6,661,454 B1 * | 12/2003 | Hwang et al. | 348/231.1 |
| 6,754,267 B1 * | 6/2004 | Shimanaka | 375/240.03 |
| 6,825,846 B2 * | 11/2004 | Mondal | 345/547 |
| 6,832,271 B1 * | 12/2004 | Ivan et al. | 710/15 |
| 6,865,283 B1 * | 3/2005 | Cheung | 382/107 |
| 2001/0012064 A1 | 8/2001 | Kubo | |
| 2005/0140789 A1 * | 6/2005 | Yasuda | 348/207.2 |

(Continued)

FOREIGN PATENT DOCUMENTS

| | | |
|---|---|---|
| JP | 2002-215275 | 7/2002 |
| JP | 2005-20306 | 1/2005 |

(Continued)

OTHER PUBLICATIONS

Office Action issued Aug. 10, 2010, in Japan Patent Application No. 2005-375156.

(Continued)

*Primary Examiner* — Henry W. H. Tsai
*Assistant Examiner* — Aurangzeb Hassan
(74) *Attorney, Agent, or Firm* — Oblon, Spivak, McClelland, Maier & Neustadt, L.L.P.

(57) ABSTRACT

An information processing apparatus includes a plurality of recording media, an operation unit receiving an operation from a user, a communication unit outputting data stored on the recording media to an external device, and a controller displaying, on a display unit, a setting screen for setting a mode for outputting data via the communication unit and to control the apparatus on the basis of information input on the setting screen. The controller displays, as the setting screen, a function selection screen enabling the user to simultaneously select a recording medium serving as a source from which data is output via the communication unit and a function to be executed. On the basis of information input on the function selection screen using the operation unit, the controller performs a setting operation to output data recorded on the selected recording medium in accordance with a communication mode based on the selected function.

19 Claims, 8 Drawing Sheets

(56) References Cited

U.S. PATENT DOCUMENTS

| | | |
|---|---|---|
| 2005/0174443 A1* | 8/2005 | Niimura et al. ............ 348/231.2 |
| 2007/0174526 A1* | 7/2007 | Blackwell et al. ............... 710/73 |
| 2008/0005418 A1* | 1/2008 | Julian ............................ 710/62 |
| 2008/0043110 A1* | 2/2008 | Aizawa ...................... 348/211.2 |

FOREIGN PATENT DOCUMENTS

| | | |
|---|---|---|
| JP | 2005-86639 | 3/2005 |
| JP | 2005-175794 | 6/2005 |
| JP | 2005-295478 | 10/2005 |
| JP | 2005-354639 | 12/2005 |
| WO | WO 2004/095452 A2 | 11/2004 |

OTHER PUBLICATIONS

Japanese Office Action issued on May 24, 2011 in corresponding application JP 2005-375156 filed Dec. 27, 2005.

Extended European Search Report issued on Jan. 17, 2012 in the corresponding European Application No. 06026492.6.

* cited by examiner

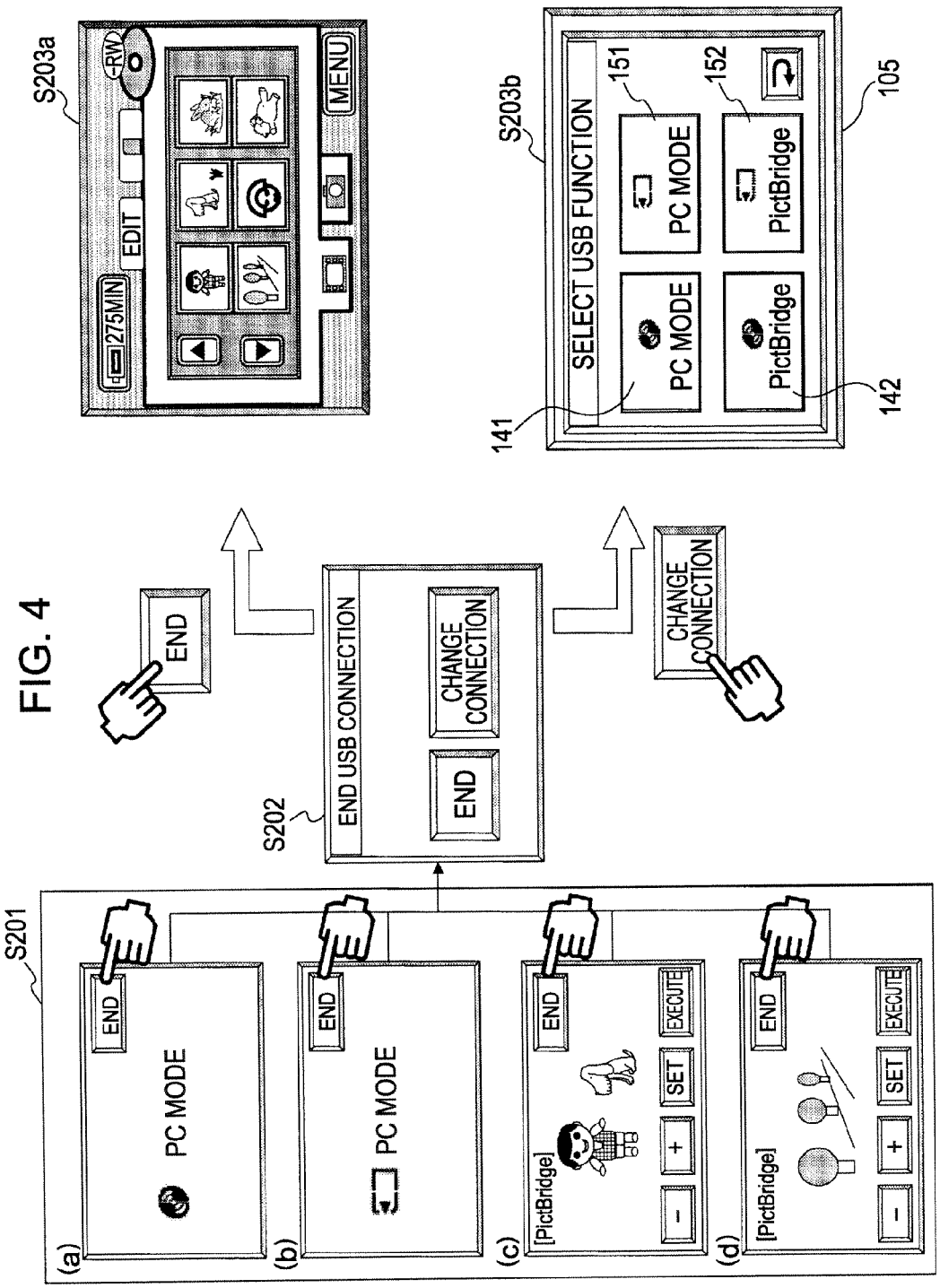

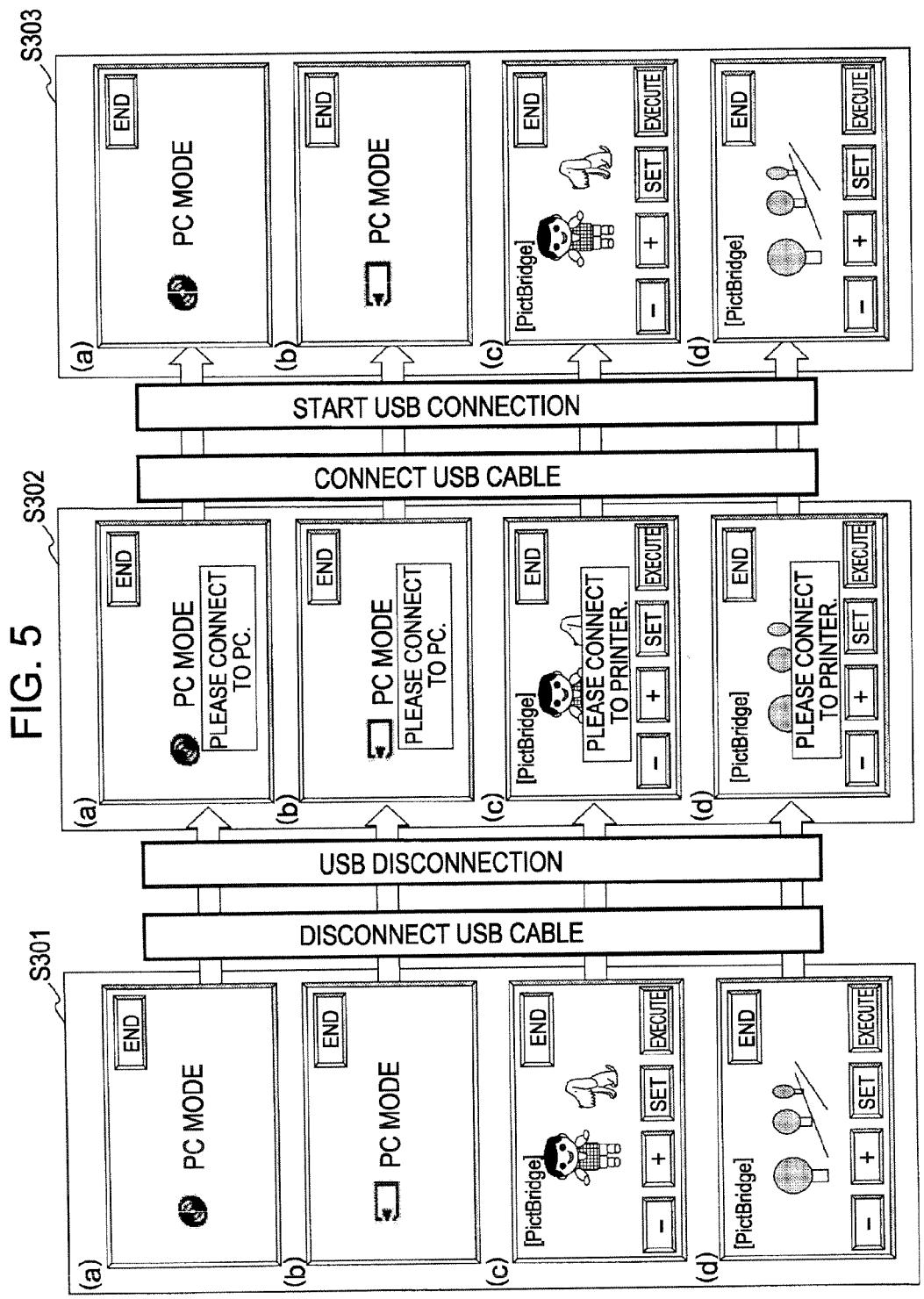

ND METHOD, AND COMPUTER PROGRAM
INFORMATION PROCESSING APPARATUS AND METHOD, AND COMPUTER PROGRAM THEREFOR

CROSS REFERENCES TO RELATED APPLICATIONS

The present invention contains subject matter related to Japanese Patent Application JP 2005-375156 filed in the Japanese Patent Office on Dec. 27, 2005, the entire contents of which are incorporated herein by reference.

BACKGROUND OF THE INVENTION

1. Field of the Invention

The present invention relates to information processing apparatuses and methods and computer programs therefor. More particularly, the present invention relates to an information processing apparatus that has a plurality of recording media, such as a digital versatile disk (DVD) and a flash memory, and that selects data recorded on each medium and outputs the data to a personal computer (PC) or a printer serving as an external device, and to an information processing method and a computer program therefor.

2. Description of the Related Art

Universal serial bus (USB) has in recent years been widely used in data communication between an information processing apparatus, such as a PC, and its peripheral device. Data communication using USB is performed between a host, such as a PC, and a slave, such as a printer, a mouse, or a display. The slave holds a table referred to as a descriptor describing its attribute. The host, such as a PC, connected via USB to the slave obtains the descriptor from the USB-connected device (slave) to identify a driver compatible with the slave. The host loads the identified driver and performs slave-compatible data communication.

An example of a slave device includes an imager, such as a video camera or a still camera. An imager that has a USB connection terminal and that can be connected via a USB cable outputs imaging data recorded on, for example, a recording medium in the imager and outputs the imaging data via the USB cable to the PC, which in turn can play or edit the imaging data.

The communication standard "PictBridge" allows printing without using a PC by directly connecting a digital camera to a printer via a USB cable and directly outputting imaging data recorded on a recording medium in the imager (digital camera) to the printer.

The USB connection between the imager and the PC involves a communication specification (PC mode) such as the USB mass storage class or picture transfer protocol (PTP). In contrast, the USB connection between the imager and the printer involves the communication specification "PictBridge" standardizing the interface between PTP defining the transport layer and the application layer above the transport layer. Accordingly, different communication specifications are applied.

Even when data is output similarly using a USB cable, the case of outputting data in the "PC mode" and the case of outputting data using PictBridge involve different communication specifications. For example, in the case of a digital camera, when a USB cable is connected to the digital camera, a selection screen is presented on, for example, a monitor of the digital camera to allow a user to select a function.

Known general digital cameras employ a single recording medium. A graphical user interface (GUI) serving as a function selection screen is displayed on a monitor to allow a user to select the "PC mode" in which data recorded on the single recording medium is output to a PC or "PictBridge" in which the data is output to a printer.

Recently, however, there are imagers with a plurality of different recording media, such as a DVD and a flash memory. These imagers can select the appropriate recording medium from among the different recording media to record data. As the number of recording media increases, there is a necessity not only to select the USB function but also to simultaneously select the recording medium.

It is necessary for an information processing apparatus, such as a digital camera, with a plurality of recording media to select the function upon establishment of a USB connection and to change, using a device switch by way of example, the recording medium for which the USB function is performed. Also, in the case where pieces of data are recorded on a plurality of different recording media in a distributed manner, when the pieces of data recorded on these plural different recording media are to be successively viewed and edited on a PC, or when these pieces of data are to be printed, it is necessary to perform complicated and inefficient operations involving selecting one recording medium and the USB function therefor, outputting data to the selected recording medium, selecting thereafter the next recording medium using a hard switch, and selecting the USB function again on the function selection screen displayed on the monitor.

The USB cable is disconnected from the information processing apparatus, such as the imager, with the USB function upon the ending of the USB function. When the USB cable is disconnected, the information processing apparatus such as the imager detects the disconnection of the USB cable, ends the USB function mode, and returns to the normal mode.

Thereafter, upon the reconnection of the USB cable, as has been described above, in the PC mode, it is necessary for the host device (PC) to obtain the descriptor of the slave device and to refer to the descriptor to determine the specification with which the host device communicates with the slave side. Therefore, it takes a time to establish a connection in the PC mode again when the USB cable is disconnected and then reconnected.

SUMMARY OF THE INVENTION

It is desirable to provide an information processing apparatus, such as an imager, which has a plurality of recording media and which presents a function selection screen allowing a user to simultaneously select a medium and a function serving as a specification for outputting data via a communication unit, thereby efficiently determining a data output mode and easily changing the medium, and to provide an information processing method and a computer program therefor.

More specifically, it is desirable to provide an information processing apparatus with, for example, a USB cable serving as communication means, which presents a GUI serving as a function selection screen allowing a user to simultaneously select a USB function serving as a specification for outputting data using the USB cable, thereby efficiently determining a data output mode and easily changing the medium, and to provide an information processing method and a computer program therefor.

According to a first embodiment of the present invention, there is provided an information processing apparatus including the following elements: a plurality of data-recordable recording media; an operation unit operable to receive an operation from a user; a communication unit operable to output data stored on the recording media to an external device; and a controller operable to display a setting screen for setting a data output mode for outputting data via the communication unit on a display unit and to control the information processing apparatus on the basis of information input on the setting screen using the operation unit. The controller displays, as the setting screen displayed on the display unit, a function selection screen enabling the user to simultaneously select a recording medium serving as an output data source from which data is output via the communication unit and a function to be executed via the communication unit. On the basis of information input on the function selection screen using the operation unit, the controller performs a setting operation to output data recorded on the selected recording medium in accordance with a communication mode based on the selected function.

The controller may display the function selection screen enabling the user to simultaneously select the recording medium serving as the output data source from which data is output via the communication unit and, as the function to be executed, one of a mass storage mode and a print mode. The controller may also perform, on the basis of selection information input on the function selection screen, a setting operation to output the data recorded on the selected recording medium in accordance with a communication mode corresponding to the selected mass storage mode or to output print data in accordance with a communication mode corresponding to the print mode.

The controller may display, on the display unit, a selection screen enabling the user to select termination of outputting of data via the communication unit or changing of the recording medium serving as the output data source from which data is output via the communication unit or the function to be executed.

In the case where the information processing apparatus communicates with the external device in accordance with the communication mode based on the selected function, when the information processing apparatus is disconnected from the external device, the controller may maintain the mode of the information processing apparatus set at the time the information processing apparatus was disconnected from the external device.

The communication unit may output data to the external device via a universal serial bus (USB) cable according to the USB standard. When the USB cable is disconnected from the communication unit or the external device, the controller may maintain the mode of the information processing apparatus set at the time the USB cable was disconnected.

The communication unit may output data to the external device via a universal serial bus (USB) cable according to the USB standard. When the USB cable is disconnected from the communication unit or the external device, and when the mode of the information processing apparatus set at the time the USB cable was disconnected was a mass storage mode, the controller may maintain a state existing prior to the disconnection of the USB cable without transferring a right to access the recording medium set in the mass storage mode as the output data source from which data is output via the USB cable.

According to a second embodiment of the present invention, there is provided an information processing apparatus including the following elements: a plurality of data-recordable recording media; a communication unit operable to output data stored on the recording media to an external device; and a controller operable to display a function selection screen on a display unit. The controller performs a display operation to display, on the display unit, a selection screen enabling a user to select termination of outputting of data via the communication unit or changing of a recording medium serving as an output data source from which data is output via the communication unit or a function to be executed.

According to a third embodiment of the present invention, there is provided an information processing apparatus including the following elements: a plurality of data-recordable recording media; a USB connector operable to output data stored on the recording media via a USB cable; and a controller operable to display a GUI serving as a function selection screen on a display unit. The controller performs a display operation to display, on the display unit, a GUI enabling a user to select termination of outputting of data via the USB cable or changing of a recording medium serving as an output data source from which data is output via the USB cable or a USB function to be executed.

According to a fourth embodiment of the present invention, there is provided an information processing apparatus including the following elements: a plurality of data-recordable recording media; a USB connector operable to output data stored on the recording media via a USB cable; and a controller operable to maintain, when the USB cable is disconnected from the USB connector, a mode of the information processing apparatus set at the time the USB cable was disconnected.

When the USB cable is disconnected from the USB connector, and when the mode of the information processing apparatus set at the time the USB cable was disconnected was a mass storage mode, the controller may maintain a state existing prior to the disconnection of the USB cable without transferring a right to access the recording medium set in the mass storage mode as an output data source from which data is output via the USB cable.

According to a fifth embodiment of the present invention, there is provided an information processing method performed by an information processing apparatus including a plurality of data-recordable recording media and a communication unit operable to output data stored on the recording media to an external device. The method includes the steps of displaying, on a display unit, a setting screen for setting a data output mode for outputting data via the communication unit, the setting screen being a function selection screen enabling a user to simultaneously select a recording medium serving as an output data source from which data is output via the communication unit and a function to be executed; and controlling the information processing apparatus on the basis of information input on the setting screen, the information being selection information input on the function selection screen, to output data recorded on the selected recording medium in accordance with the selected function.

When the function selection screen is displayed, the user may be enabled to simultaneously select the recording medium serving as the output data source from which data is output via the communication unit and, as the function to be executed, one of a mass storage mode and a print mode. On the basis of the selection information input on the function selection screen, the information processing apparatus may be controlled to output the data recorded on the selected recording medium in accordance with a communication mode corresponding to the selected mass storage mode or to output print data in accordance with a communication mode corresponding to the print mode.

The information processing method may further include the step of displaying, on the display unit, a selection screen enabling the user to select termination of outputting of data via the communication unit or changing of the recording medium serving as the output data source from which data is output via the communication unit or a USB function to be executed.

The information processing method may further include the step of maintaining, in the case where the information processing apparatus communicates with the external device in accordance with the communication mode based on the selected function, when the information processing apparatus is disconnected from the external device, the mode of the information processing apparatus set at the time the information processing apparatus was disconnected from the external device.

According to a sixth embodiment of the present invention, there is provided an information processing method performed by an information processing apparatus including a plurality of data-recordable recording media and a USB connector operable to output data stored on the recording media via a USB cable. The method includes the steps of displaying, on a display unit, a setting screen for setting a data output mode for outputting data via the USB connector, the setting screen being a function selection screen enabling a user to simultaneously select a recording medium serving as an output data source from which data is output via the USB cable and a function to be executed; and controlling the information processing apparatus on the basis of information input on the setting screen, the information being selection information input on the function selection screen, to output data recorded on the selected recording medium in accordance with the selected function.

The information processing method may further include the step of maintaining, when the USB cable is disconnected from the USB connector or from a device connected to the information processing apparatus via the USB connector, and when the mode of the information processing apparatus set at the time the USB cable was disconnected was a mass storage mode, a state existing prior to the disconnection of the USB cable without transferring a right to access the recording medium set in the mass storage mode as the output data source from which data is output via the USB cable.

According to a seventh embodiment of the present invention, there is provided an information processing method performed by an information processing apparatus including a plurality of data-recordable recording media and a USB connector operable to output data stored on the recording media via a USB cable. The method includes the step of displaying a function selection screen on a display unit, the function display screen being a setting screen enabling a user to select termination of outputting of data via the USB cable or changing of a recording medium serving as an output data source from which data is output via the USB cable or a USB function to be executed.

According to an eighth embodiment of the present invention, there is provided an information processing method performed by an information processing apparatus including a plurality of data-recordable recording media and a USB connector operable to output data stored on the recording media via a USB cable. The method includes the step of maintaining, when the USB cable is disconnected from the USB connector or from a device connected to the information processing apparatus via the USB connector, a mode of the information processing apparatus set at the time the USB cable was disconnected.

When the USB cable is disconnected from the USB connector or from the device connected to the information processing apparatus via the USB connector, and when the mode of the information processing apparatus set at the time the USB cable was disconnected was a mass storage mode, the information processing apparatus may be controlled to maintain a state existing prior to the disconnection of the USB cable without transferring a right to access the recording medium set in the mass storage mode as an output data source from which data is output via the USB cable.

According to a ninth embodiment of the present invention, there is provided a computer program for allowing an information processing apparatus including a plurality of data-recordable recording media and a communication unit operable to output data stored on the recording media to an external device to perform information processing including the steps of displaying, by a controller, a setting screen on a display unit for setting a data output mode for outputting data via the communication unit, the setting screen being a function selection screen enabling a user to simultaneously select a recording medium serving as an output data source from which data is output via the communication unit and a function to be executed; and controlling, by the controller, the information processing apparatus on the basis of information input on the setting screen, the information being selection information input on the function selection screen, to output data recorded on the selected recording medium in accordance with the selected function.

The computer program according to the embodiment of the present invention is a computer program provided to a general-purpose computer system that can execute various program codes by a computer-readable storage medium, such as a compact disc (CD), a floppy disk (FD), a magneto-optical (MO) disc, or a communication medium, such as a network. By providing such a program in a computer-readable format, the processing associated with the program can be executed on a computer system.

Further objects, features, and advantages of the embodiments of the present invention will become apparent from detailed description based on the later-described embodiments of the present invention and the appended drawings. Note that the term "system" in this document is a logical set of a plurality of apparatuses and is not limited to the structure in which these apparatuses are housed in a single housing.

According to the embodiments of the present invention, in an information processing apparatus, such as an imager, which has a plurality of data-recordable recording media, such as a DVD and a flash memory, and which can output data stored on the recording media through a communication unit, as a setting screen for setting a data output mode for outputting data via the communication unit, a function display screen is displayed enabling a user to simultaneously select a recording medium serving as an output data source from which data is output via the communication unit and a communication mode to be executed, such as a data output mode for outputting data to a PC or a data output mode for outputting data to a printer. Therefore, it is unnecessary to disconnect communication means when changing the medium serving as the output data source. It thus becomes possible to efficiently change the medium, the output mode, or the output destination.

According to the embodiments of the present invention, in an information processing apparatus, such as an imager, which has a plurality of data-recordable recording media, such as a DVD and a flash memory, and which can output data recorded on the recording media through a USB cable, when a setting screen for setting a data output mode for outputting data via USB is displayed as a GUI on a display unit, a function selection screen is displayed enabling a user to simultaneously select a recording medium serving as an output data source from which data is output via the USB cable and a USB function to be executed, that is, a USB function including a PC mode or PictBridge to be executed. Therefore, it is unnecessary to break a USB connection when changing the medium serving as the output data source. It thus becomes possible to efficiently change the medium, the output mode, or the output destination.

BRIEF DESCRIPTION OF THE DRAWINGS

FIG. 4 is a diagram showing a processing sequence using the USB function selection screen and a USB disconnection screen, which are presented as the GUI in the imager;

FIG. 5 is a diagram showing a processing sequence in the case where a USB cable is disconnected and then reconnected to the imager;

DESCRIPTION OF THE PREFERRED EMBODIMENTS

An information processing apparatus and method and a computer program therefor according to embodiments of the present invention will be described in detail with reference to the drawings.

Figure 1:
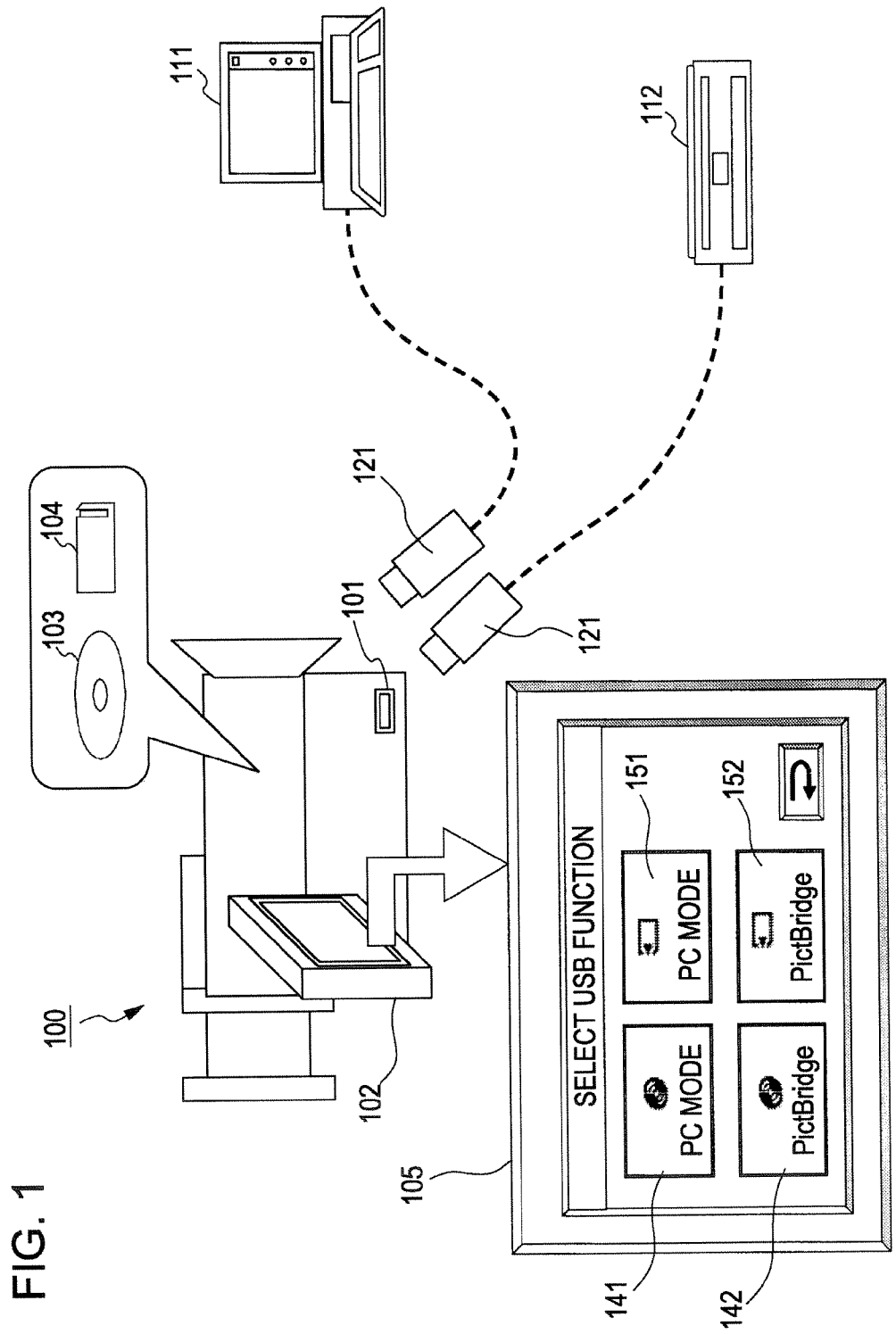
FIG. 1 is a diagram showing the structure of an imager serving as an example of an information processing apparatus according to an embodiment of the present invention and a GUI and the data output processing performed by the imager.

The outline of the data output processing performed, using a USB cable, by an imager serving as an example of an information processing apparatus according to an embodiment of the present invention will be described. FIG. 1 shows an imager (video camera) 100 serving as the example of the information processing apparatus according to the embodiment of the present invention. The imager (video camera) 100 includes a USB terminal 101 serving as a communication unit connecting to USB cables 121 and a display unit 102 displaying recorded data and imaging data and presenting a GUI serving as a function selection screen. The imager 100 is configured to be connectable to a PC 111 or a printer 112 serving as an external device via the USB cable 121 connected to the USB terminal 101. The display unit 102 also functions as an operation unit receiving operations from a user.

The imager 100 has a plurality of data-recordable recording media. For example, the imager 100 shown in FIG. 1 has a DVD 103 and a flash memory 104 as the recording media. The user can select one of the recording media to record imaging data. The data recorded on these recording media can be output to the PC 111 or the printer 112 connected to the imager 100 via the USB cable 121. In the embodiment, a combination of the DVD and the flash memory serving as the multiple recording media is described by way of example. However, the present invention is not limited to this combination. The present invention is also applicable to a combination of other recording media or to the case where the imager has three or more than three recording media.

In the embodiment described below, the case where the USB cable is used as communication means for communicating with external devices and the information processing apparatus has the USB terminal 101 serving as the communication unit will be described. However, besides the USB cable, the information processing apparatus may be connected to the PC 111 and the printer 112 serving as external devices via other cables or wirelessly. Note that the information processing apparatus has communication means for communicating with external devices and can set multiple connection modes for connecting to the associated external devices according to the multiple recording media. In addition, the information processing apparatus displays a selection screen that allows setting of the multiple connection modes corresponding to the associated recording media.

As has been described above, data is output from the imager 100 to the PC 111 using a USB connection involving data communication using a communication specification (communication mode using the USB connection) such as the USB mass storage class or PTP. Also, data is output from the imager 100 to the printer 112 using a USB connection involving data communication using the communication specification "PictBridge" standardizing the interface between the PTP defining the transport layer and the application layer above the transport layer. In this manner, data is output to the PC 111 in the PC mode, whereas data is output to the printer 112 using PictBridge (mode), which means that different communication specifications are applied.

In the case where data is output using the USB cable 121, the communication specification is different between the case where data is output in the "PC mode" where data is output in the mass storage mode and the case where data is output using "PictBridge". Therefore, when the USB cable 121 is connected to the imager 100, the imager 100 presents a GUI serving as a function selection screen on which the user can input operation information on, for example, the display unit 102 of the imager 100 to allow the user to select the function.

FIG. 1 shows a GUI screen 105 serving as a function selection screen displayed on the display unit 102 of the imager 100 according to the embodiment of the present invention. The GUI screen 105 includes, as shown in FIG. 1, four function selection buttons 141, 142, 151, and 152. The function selection buttons 141, 142, 151, and 152 serve as switches for selecting the following functions:

the function selection button 141 for selecting a DVD-compatible PC mode for outputting data recorded on the DVD 103 to the PC 111;

the function selection button 142 for selecting a DVD-compatible PictBridge mode for outputting the data recorded on the DVD 103 to the printer 112;

the function selection button 151 for selecting a flash-memory-compatible PC mode for outputting data recorded on the flash memory 104 to the PC 111; and the function selection button 152 for selecting a flash-memory-compatible PictBridge mode for outputting the data recorded on the flash memory 104 to the printer 112.

The term "PC mode" means a mode corresponding to the so-called mass storage mode allowing an information processing apparatus (imager) to perform communication with an external device such as a PC via a communication unit such as a USB terminal and to output data stored in a medium in the information processing apparatus (imager) to the connected PC via the communication unit, thereby enabling the external device such as the PC to obtain the data recorded on the medium. The term "PictBridge mode" means a mode where the information processing apparatus (imager) directly communicates with a printer via the communication unit to output printing data from the information processing apparatus (imager) to the printer.

Accordingly, the imager according to the embodiment of the present invention can simultaneously select (A) the USB function and (B) the recording medium, namely, (A) USB function to be selected includes:
(A1) PC mode; and
(A2) PictBridge mode, and
(B) the recording medium to be selected includes:
(B1) DVD; and
(B2) flash memory.

It thus becomes unnecessary to perform operations involving changing the medium to be selected using a hardware switch and thereafter selecting the USB function on the represented function selection screen. By presenting only the function selection screen serving as the GUI screen 105, the medium can be selected, and the USB function (PC mode or PictBridge mode) can be selected.

Figure 2:
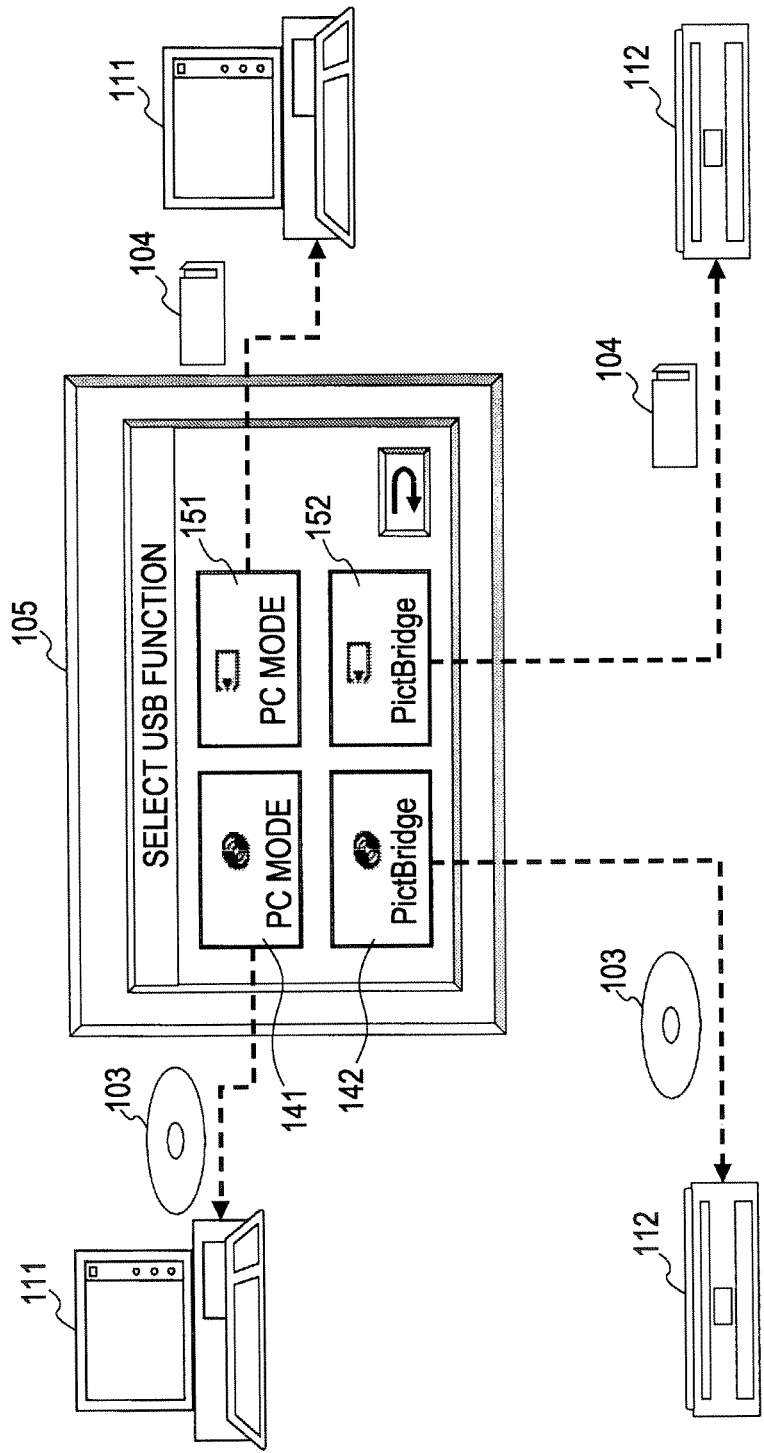
FIG. 2 is a diagram showing the GUI presented on a display unit of the imager serving as the example of the information processing apparatus according to the embodiment of the present invention and the data output processing performed by the imager.

As shown in FIG. 2, to output the data recorded on the DVD 103 to the PC 111, the user selects the function selection button 141 on the function selection screen presented as the GUI screen 105. To output the data recorded on the DVD 103 to the printer 112 to print the data, the user selects the function selection button 142. To output the data recorded on the flash memory 104 to the PC 111, the user selects the function selection button 151 on the function selection screen presented as the GUI screen 105. To output the data recorded on the flash memory 104 to the printer 112 to print the data, the user selects the function selection button 152.

With reference to FIGS. 3 to 6 Å and 6B, specific processing sequences in the case where the USB function and the recording medium are selected in the imager according to the embodiment of the present invention will be described.

Figure 3:
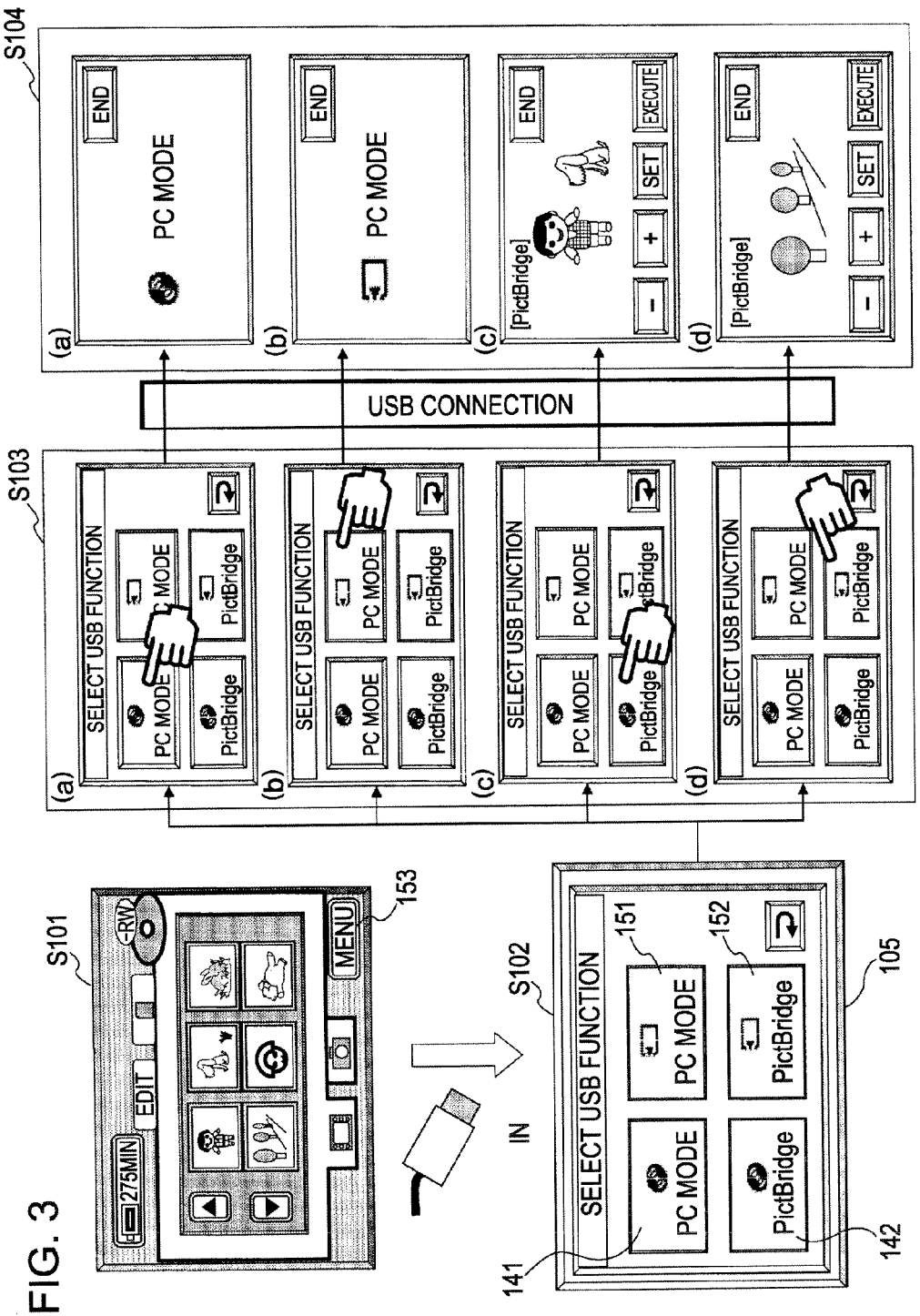
FIG. 3 is a diagram showing a function selection processing sequence using a USB function selection screen presented as the GUI in the imager.

Referring to FIG. 3, an example of a process of selecting the function using the GUI serving as the function selection screen displayed on the display unit 102 of the imager 100 shown in FIG. 1 will be described. In step S101, an example of a displayed screen is shown on the display unit 102. The screen is a screen displayed on the display unit 102 in a playback mode for selecting a data file already recorded on a recording medium. That is, the screen is an index screen displaying index information regarding pieces of the recorded content.

For example, upon connection of the USB cable 121 to the USB terminal 101 of the imager 100 when the screen in the playback mode or other modes is displayed, a controller of the imager 100 detects the connection of the USB cable 121. This detection information triggers the displaying of the GUI screen 105 for selecting the USB function, which is shown in step S102 of FIG. 3. Alternatively, when the user operates (touches) a menu button 153 on the playback-mode screen displayed in step S101, the controller displays the GUI screen 105 for selecting the function, which is shown in step S102, on the basis of the operation information.

On the GUI screen 105 displayed in step S102, a plurality of GUI buttons are shown, allowing simultaneous selection of the USB function to be connected and the associated recording medium. That is, as has been described above, the following function selection buttons are displayed:

the function selection button 141 for selecting the DVD-compatible PC mode for outputting the data recorded on the DVD 103 to the PC 111;

the function selection button 142 for selecting the DVD-compatible PictBridge mode for outputting the data recorded on the DVD 103 to the printer 112;

the function selection button 151 for selecting the flash-memory-compatible PC mode for outputting the data recorded on the flash memory 104 to the PC 111; and the function selection button 152 for selecting the flash-memory-compatible PictBridge mode for outputting the data recorded on the flash memory 104 to the printer 112.

From among these function selection buttons, the user selects and operates a button that coincides with a combination of the recording medium storing desired data to be output and the desired USB function to be selected (PC mode or PictBridge mode) to start a USB connection process.

For example, when the user wants to output content recorded on the DVD 103 to the PC 111, the user selects the function selection button 141 on the function selection screen presented as the GUI screen 105. That is, the user performs an operation shown in portion (a) of step S103. Alternatively, when the user wants to output the data recorded on the DVD 103 to the printer 112 to print the data, the user selects the function selection button 142. That is, the user performs an operation shown in portion (b) of step S103.

When the user wants to output the data recorded on the flash memory 104 to the PC 111, the user selects the function selection button 151 on the function selection screen presented as the GUI screen 105. That is, the user performs an operation shown in portion (b) of step S103. Alternatively, when the user wants to output the data recorded on the flash memory 104 to the printer 112 to print the data, the user selects the function selection button 152. That is, the user performs an operation shown in portion (d) of step S103.

By performing one of these operations, a USB connection in accordance with each of the selected functions is established, thereby enabling outputting of data in accordance with the associated function. Thereafter, when it becomes possible to output data, as shown in step S104, the display unit 102 presents one of screens indicating that it is ready to output or print data.

Portion (a) of step S104 of FIG. 3 shows a screen indicating that it is ready to output data in the PC mode where the data recorded on the DVD 103 can be output to the external device such as the PC 111. Portion (b) shows a screen indicating that it is ready to output data in the PC mode where the data recorded on the flash memory 104 can be output to the external device such as the PC 111. Portion (c) shows a screen indicating that it is ready to output data in the PictBridge mode where the data recorded on the DVD 103 can be output to the external device such as the printer 112. Portion (d) shows a screen indicating that it is ready to output data in the PictBridge mode where the data recorded on the flash memory 104 can be output to the external device such as the printer 112.

In this manner, using the function selection screen displayed on the display unit 102, the user can simultaneously select the recording medium storing data to be output and the USB function (PC mode or PictBridge mode) serving as a data output mode.

Referring to FIG. 4, a processing sequence in the case where the USB connection is broken or changed, that is, the recording medium is changed or the USB function (PC mode or PictBridge mode) is changed, will be described.

Screens in portions (a) to (d) of step S201 of FIG. 4 are display screens (GUIs) corresponding to the screens in portions (a) to (d) of step S104 of FIG. 3. That is, the screens are GUIs in the following modes:

- (a) PC mode where the data recorded on the DVD 103 can be output to the external device such as the PC 111;
- (b) PC mode where the data recorded on the flash memory 104 can be output to the external device such as the PC 111;
- (c) PictBridge mode where the data recorded on the DVD 103 can be output to the external device such as the printer 112; and
- (d) PictBridge mode where the data recorded on the flash memory 104 can be output to the external device such as the printer 112.

As shown in FIG. 4, each of the screens (GUIs) is provided with an "end" button. When the user operates the "end" button, the screen is changed to a selection screen in step S202. That is, the screen is changed to a GUI screen displaying an "end" button to be operated to completely break the USB connection and a "change connection" button to be operated to change the USB connection.

When the user wants to end the outputting or printing of the content stored in the recording medium, the user operates the "end" button in step S202. When the user operates the "end" button, as shown in step S203a, the screen returns to the initial screen such as the screen displayed in the playback mode, and the USB connection is thereby terminated.

Alternatively, when the user wants to change the recording medium or the USB function (PC mode or PictBridge mode) although the user wants to continue outputting or printing the content stored in the recording medium, in step S202, the user operates the "change connection" button. When the user operates the "change connection" button, as shown in step S203b, the GUI screen 105 for allowing the user to select the USB function, which has been described in step S102 of FIG. 3, is shown. That is, the display unit 102 displays the following buttons again:

- the function selection button 141 for selecting the DVD-compatible PC mode for outputting the data recorded on the DVD 103 to the PC 111;
- the function selection button 142 for selecting the DVD-compatible PictBridge mode for outputting the data recorded on the DVD 103 to the printer 112;
- the function selection button 151 for selecting the flash-memory-compatible PC mode for outputting the data recorded on the flash memory 104 to the PC 111; and
- the function selection button 152 for selecting the flash-memory-compatible PictBridge mode for outputting the data recorded on the flash memory 104 to the printer 112. By operating these selection buttons, the user can change the recording medium or the USB function (PC mode or PictBridge mode).

On the screen, the user selects and operates one of the function selection buttons, thereby selecting the specific USB function associated with the specific medium again in accordance with the processing sequence described in steps S102, S103, and S104 of FIG. 3. It thus becomes ready to output data on the selected medium to the external device (PC 111 or printer 112).

In this manner, the user can easily and efficiently change the recording medium or the USB function (PC mode or PictBridge mode).

Further, even when the USB cable 121 is disconnected from the USB terminal 101 of the imager 100 to disconnect the imager 100 from the external device such as the PC 111 or the printer 112, the imager 100 according to the embodiment of the present invention can maintain the same mode as that in which the USB cable 121 is connected.

Known general USB-connectable slave devices are such that, when a USB cable is disconnected from a USB terminal of a slave device to disconnect the slave device from an external device such as a PC or a printer, the slave device cancels the so-called PC mode which has been maintained by the USB connection and enters the normal mode where only the normal function of the imager is executed. However, when the imager 100 according to the embodiment of the present invention is in the USB-connected mode, namely, in the PC mode or the PictBridge mode, the imager 100 maintains the same mode even when the USB cable 121 is disconnected from the USB terminal 101.

A specific example will be described with reference to FIG. 5. Portions (a) to (d) of step S301 of FIG. 5 correspond to portions (a) to (d) of step S104 of FIG. 3, namely:

- (a) PC mode where the data recorded on the DVD 103 can be output to the external device such as the PC 111;
- (b) PC mode where the data recorded on the flash memory 104 can be output to the external device such as the PC 111;
- (c) PictBridge mode where the data recorded on the DVD 103 can be output to the external device such as the printer 112; and
- (d) PictBridge mode where the data recorded on the flash memory 104 can be output to the external device such as the printer 112.

In a state where each of the modes is set, when the USB cable 121 is disconnected from the USB terminal 101, the USB connection with the external device (PC 111 or printer 112) via the USB cable 121 is broken. At this point, a known device such as an imager serving as a USB slave device cancels the USB connection state and returns to the normal mode. However, the imager 100 according to the embodiment of the present invention does not return to the normal mode and maintains a state substantially the same as the state where the imager 100 is connected via the USB cable 121 to the external device. Here, only the connection state established by a class driver serving as a so-called physical connection is cancelled. The details of the processing will be described subsequently with reference to FIGS. 6A and 6B.

A screen displayed on the display unit 102 of the imager 100 in a state where the USB cable 121 is disconnected from the USB terminal 101 is one of the screens shown in portions (a) to (d) of step S302 of FIG. 5. When the controller of the imager 100 detects that the USB cable 121 is disconnected from the USB terminal 101, the controller displays, on the display unit 102, a warning message indicating that the imager 100 is not connected to the PC 111 or the printer 112 serving as a device to which data is output. This corresponds to one of the screens shown in portions (a) to (d) of step S302 of FIG. 5. The disconnection of the USB cable 121 from the USB terminal 101 includes the case where the USB cable 121 is disconnected from the USB terminal 101 of the imager 100 and the case where the USB cable 121 is disconnected from a device connected to the imager 100.

From the warning message, the user can be notified that the USB cable 121 is disconnected. Therefore, the user connects the USB cable 121 to the USB terminal 101 to establish a USB connection with the external device (PC 111 or printer 112). With this processing, a connection is established with the class driver associated with the connected external device, thereby returning to the USB connection state set prior to the disconnection of the USB cable 121. As a result, one of screens (a) to (d) of step S303 of FIG. 5 is displayed on the display unit 102. The screens (a) to (d) of step S303 are the same as those displayed prior to the disconnection of the USB cable 121, that is, the screens (a) to (d) of step S301. Upon the reconnection of the USB cable 121, the imager 100 promptly returns to the USB connection mode, which is the mode set prior to the disconnection of the USB cable 121.

Figure 6A:
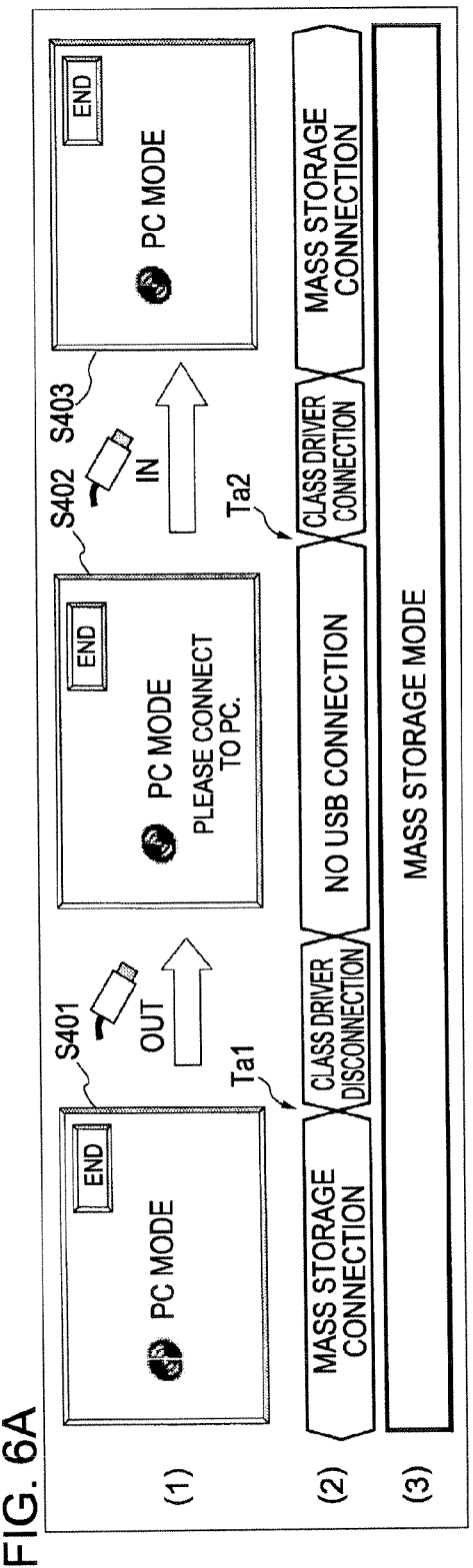
FIGS. 6A and 6B are diagrams showing processing sequences in the case where the USB cable is disconnected and then reconnected to the imager.
Figure 6B:
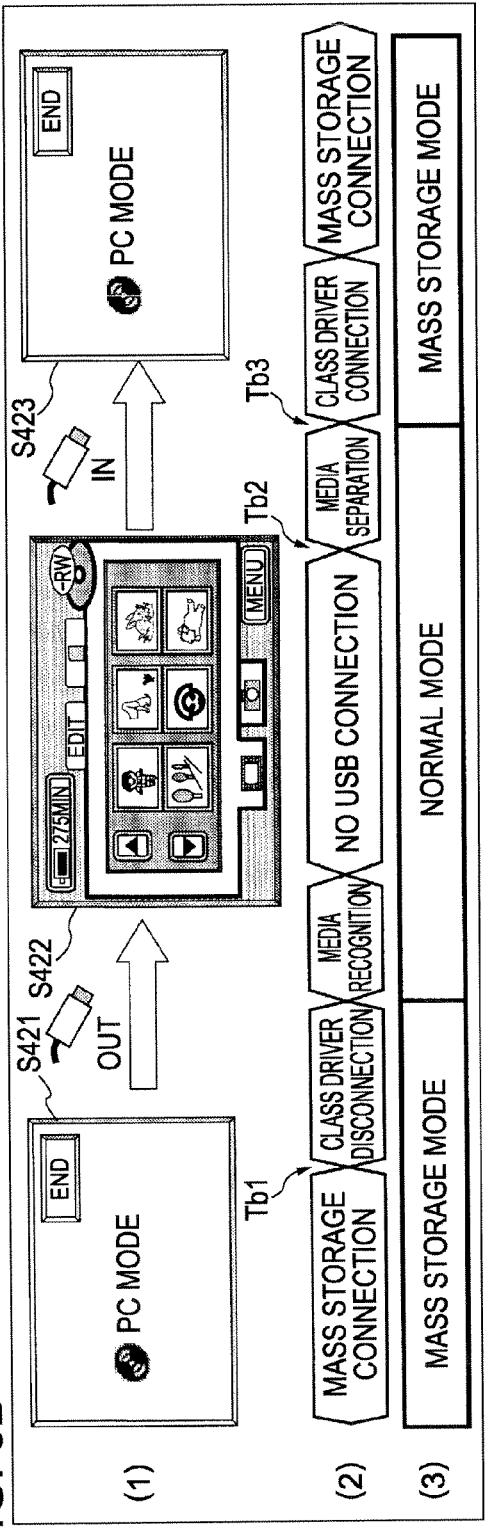

Referring to FIGS. 6A and 6B, a state sequence in the case where, from an imager connected via a USB cable to a PC, the USB cable is disconnected and then reconnected will be described.

FIG. 6A shows a processing sequence of the information processing apparatus (imager 100) according to the embodiment of the present invention. FIG. 6B shows a processing sequence of a known general USB connection device (slave). First, a state sequence in the case where, from the known general USB connection device (slave) connected via a USB cable to a host (PC) (step S421), the USB cable is disconnected and then reconnected will be described.

Data communication using USB is performed between a host, such as a PC, and a device serving as a slave. In this example, the slave is the imager. As has been described above, the slave holds a table referred to as a descriptor describing its attributes. The host, such as a PC, which is USB-connected to the slave, obtains the descriptor from the USB connection device (slave) to identify a driver compatible with the slave. The host loads the identified driver and performs slave-compatible data communication.

By transferring a right to access a recording medium in the slave (imager) to the host (PC), the PC serving as the host can process the recording medium in the slave (imager) in a manner similar to that in which the host (PC) processes a storage device, such as a hard disk, in the PC. The standard for controlling the connection of the storage device in the USB-compatible device to the PC and the data processing is referred to as the USB mass storage class.

Given the imager serving as a USB-compatible device as the slave and the PC as the host, when data on a DVD or a flash memory serving as a recording medium in the imager is to be transferred to the PC, control according to the USB mass storage class is performed. To perform the processing according to the USB mass storage class, the imager serving as the slave device is set to be in the mass storage mode. The mass storage mode is a mode to be set to the slave for performing the processing according to the USB mass storage class. To perform the processing according to the USB mass storage class, it is necessary to establish a connection with the class driver set in the host.

The outline of the sequence of the connection processing between the host (PC) and the slave (imager in this case) according to the mass storage class will be briefly described. In response to an instruction from the host (PC), the slave (imager) transmits device information referred to as a descriptor to the host. The device information includes, besides the device information necessary for the USB connection, information regarding the connection class, subclass, protocol, or the like.

On the basis of the information received from the slave, the host activates a class driver necessary for establishing a connection. In this exemplary processing, the USB mass storage class driver is activated. In response to the activation of the class driver, an access path from an application program to be executed in the host (PC) to a recording medium in the slave via the USB mass storage class driver is set.

In the imager serving as the known slave device shown in FIG. 6B, a state sequence in the case where, from the imager connected via the USB cable to the host (PC) (step S421), the USB cable is disconnected and then reconnected will be described. In FIG. 6B, portion (1) shows a transition of a screen displayed on a display unit; portion (2) shows the processing executed by the imager; and portion (3) shows a transition of a setting mode of the imager. In FIG. 6B, it is assumed that time (t) passes from the left to the right.

Up to time Tb1, the USB cable is connected to the host (PC), and the screen displays that the mode is the PC mode, as shown in step S421. Up to time Tb1, the imager is maintained in a mass storage connection state or the mass storage mode.

At time Tb1, the USB cable is disconnected from the imager. At this point, the imager is disconnected from the class driver of the host (PC). When the controller of the imager detects that the USB connection is broken and the imager is disconnected from the class driver of the host (PC), the controller performs an operation to change from the mass storage mode to the normal mode. Specifically, after the disconnection from the class driver, medium recognition is performed to enable an application to be executed in the imager to access the recording medium (DVD in the example shown in FIG. 6B) in the imager, the access right to which has been transferred to the host (PC). When the medium recognition is performed, a content file on the medium is read by the application executed in the imager, and, for example, an index screen shown in step S422 of FIG. 6B is presented on the display unit. This is a state where the USB cable is disconnected from the USB terminal.

At time Tb2, the USB cable is connected to the USB terminal, thereby establishing a connection with the host (PC) again. To transfer the right to access the recording medium (DVD) to the host (PC), the controller of the imager performs the medium separation to release the right to access the medium in the imager. Further, the controller of the imager establishes a connection with the class driver of the host and enters the mass storage mode serving as the mass storage connection state where the right to access the medium (DVD) is given to the host (PC). With this transition processing, the screen shown in step S423 indicating the PC mode is presented on the display unit.

The mode transition of the imager is such that the imager is in the mass storage mode up to time Tb1 in which the right to access the medium (DVD) is given to the host (PC). Upon disconnection of the USB cable and breakage of connection with the class driver of the host (PC), the imager performs the medium recognition and enters the normal mode where the right to access the medium (DVD) is given to the imager. At time Tb2, the USB cable is reconnected, and the medium separation is performed. At time Tb3, a process of establishing a connection with the class driver is started, and the imager enters the mass storage mode where the right to access the medium (DVD) is given to the host (PC).

In this manner, the imager serving as the known USB slave device performs the medium recognition in response to disconnection of the USB cable and performs the processing to return the right to access the medium to the imager. When the USB cable is reconnected, the imager performs the medium separation and changes its mode. That is, the imager changes its mode according to the connection/disconnection of the USB cable.

In contrast, when the imager 100 according to the embodiment of the present invention is in a USB connection state, even in the case where the USB cable 121 is disconnected from the imager 100, the imager 100 does not enter the normal mode and maintains the mode set in the USB connection state. Referring to FIG. 6A, a processing sequence of the imager 100 according to the embodiment of the present invention will be described.

In FIG. 6A, as in FIG. 6B, portion (1) shows a transition of a screen displayed on the display unit 102; portion (2) shows the processing executed by the imager 100; and portion (3) shows a transition of a setting mode of the imager 100. In FIG. 6A, it is assumed that time (t) passes from the left to the right.

Up to time Ta1, the USB cable 121 is connected to the host (PC 111), and the screen displays that the mode is the PC mode, as shown in step S401. Up to time Ta1, the imager 100 is maintained in a mass storage connection state or the mass storage mode.

At time Ta1, the USB cable 121 is disconnected from the imager 100. At this point, the imager 100 is disconnected from the class driver of the host (PC 111). This is the same as the known USB slave device. However, when the controller of the imager 100 according to the embodiment of the present invention detects that the USB connection is broken and the imager 100 is disconnected from the class driver of the host (PC 111), the controller maintains the mass storage mode, without performing the processing to change from the mass storage mode to the normal mode. Specifically, even after the disconnection from the class driver, the imager 100 maintains the mass storage mode where the right to access the recording medium (DVD 103 in the example shown in FIG. 6A) in the imager 100 is given to the host (PC 111).

At this point, as shown in step S402, a warning message indicating that the USB cable 121 is disconnected is presented on the screen on the display unit 102. This is a state where the USB cable 121 is disconnected from the USB terminal 101.

At time Ta2, the USB cable 121 is connected to the USB terminal 101, thereby establishing a connection with the host (PC 111) again. The controller of the imager 100 establishes a connection with the class driver of the host (PC 111) and enters the mass storage connection state. At this point, the screen shown in step S403 indicating the PC mode is presented on the display unit 102.

The imager 100 is continuously maintained in the mass storage mode regardless of the connection/disconnection of the USB cable 121. Therefore, the imager 100 does not perform the medium recognition, which is performed in the case of FIG. 6B when the cable is disconnected, or the medium separation, which is performed in the case of FIG. 6B when the cable is connected. It only involves a short period of time to establish a mass storage connection between the imager 100 (slave) and the PC 111 (host).

Since the imager 100 maintains the mass storage mode even when the USB cable 121 is disconnected therefrom, for example, a process of changing the host (PC) connected to the imager 100 via the USB cable 121 can be efficiently performed in a short period of time. For example, to output data stored in the recording medium in the imager 100 to a plurality of PCs, it is necessary to connect the imager 100 to the different PCs by connecting and disconnecting the USB cable 121 to and from the PCs. Such processing can be performed efficiently.

In the above-described embodiment, the exemplary processing in the case where the USB cable is physically disconnected has been described. Alternatively, the similar processing may be performed not only when the USB cable is physically disconnected, but also when disruption of communication via cable is detected by signal detection or the like.

The functional structure of an information processing apparatus (e.g., imager) for performing the above-described processing will be described with reference to FIG. 7. The block diagram shown in FIG. 7 selectively shows the elements necessary for performing the above-described processing. An example of the specific hardware configuration of the information processing apparatus (imager) will be described subsequently with reference to FIG. 8.

Figure 7:
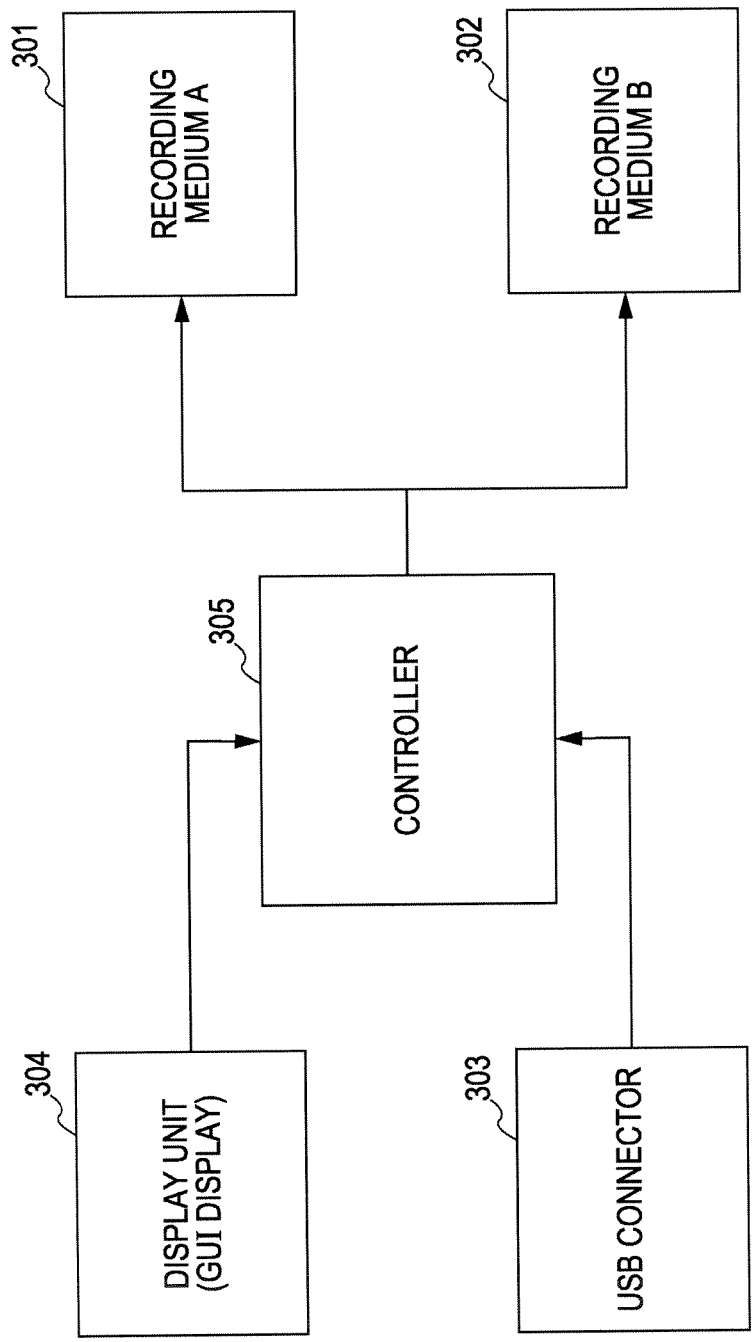
FIG. 7 is a block diagram showing the functional structure of the imager according to the embodiment of the present invention.

As shown in FIG. 7, the information processing apparatus according to the embodiment of the present invention includes a plurality of data-recordable recording media 301 and 302, a USB connector 303 with a USB terminal for outputting data stored on the recording media 301 and 302 via a USB cable, a display unit 304, and a controller 305.

The controller 305 displays a setting screen serving as a GUI for setting the data output mode for outputting data via the USB connector 303 on the display unit 304 and controls the information processing apparatus on the basis of information input to the GUI. That is, the display unit 304 serves also as an operation unit for receiving user operations.

The controller 305 displays, as a GUI to be displayed on the display unit 304, a function selection screen enabling the user to select both the recording medium serving as an output data source from which data is output via the USB cable and the USB function (PC mode or PictBridge mode) to be executed, namely, the GUI screen 105 described with reference to FIG. 2. On the basis of selection information input on the function selection screen, the controller 305 performs the setting processing to output data recorded on the selected recording medium in accordance with the selected USB function (PC mode or PictBridge mode).

As has been described with reference to FIG. 4, the controller 305 performs the processing to display, on the display unit 304, a GUI enabling the user to select one of the following:
  termination of outputting of data via the USB cable; and
  changing of the recording medium serving as the output data source from which data is output via the USB cable or the USB function to be executed.

Further, as has been described with reference to FIGS. 5, 6A, and 6B, when the USB cable is disconnected from the USB connector 303, the controller 305 performs the processing to maintain the apparatus' mode set at the time the USB cable was disconnected. Specifically, when the apparatus' mode set at the time the USB cable was disconnected was the mass storage mode, the controller 305 performs the processing to maintain the state existing prior to the disconnection of the USB cable, without transferring the right to access the recording medium set in the mass storage mode as the output data source from which data is output via the USB cable.

Figure 8:
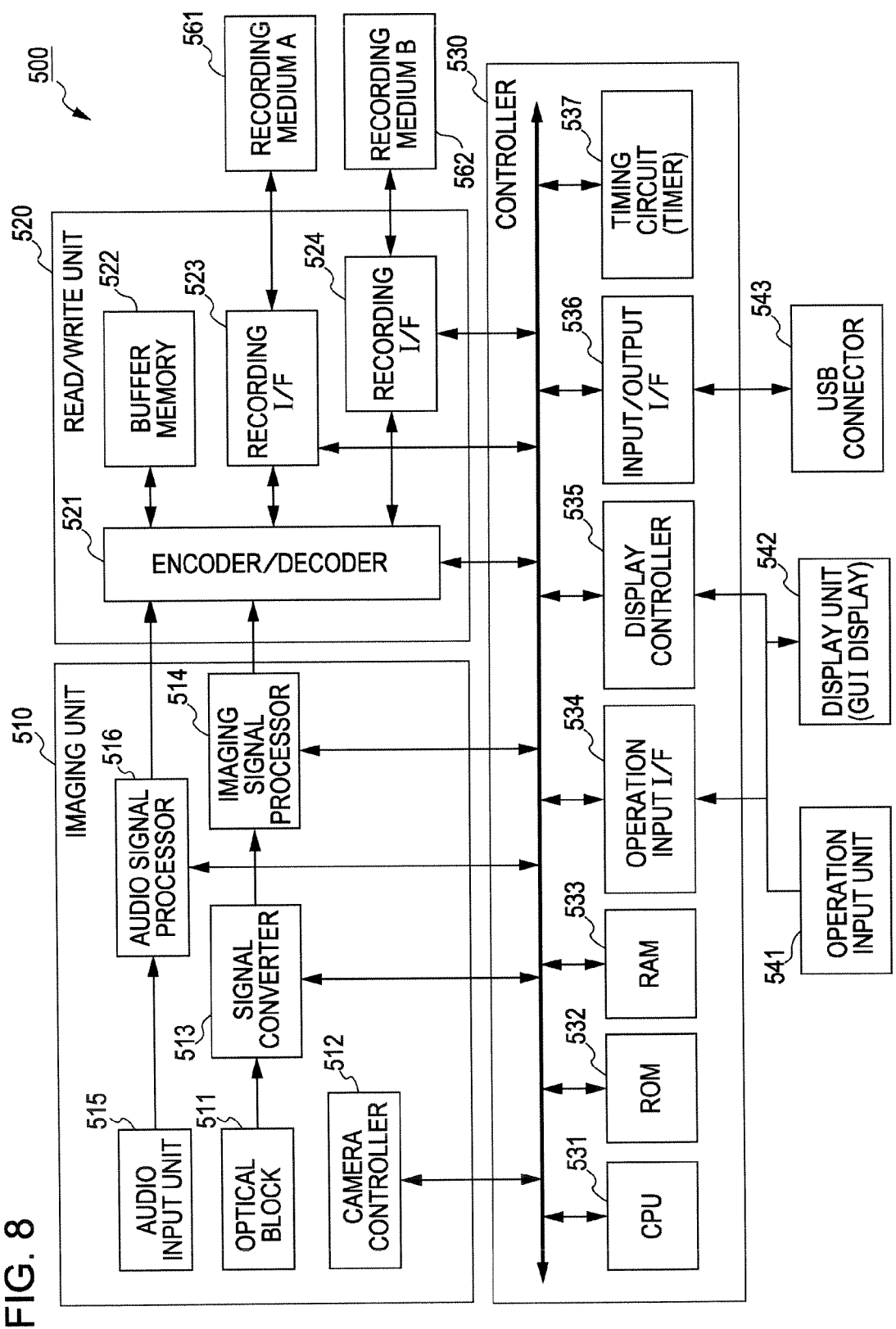
FIG. 8 is a diagram showing an example of the hardware configuration of the imager according to the embodiment of the present invention.

At last, with reference to FIG. 8, an example of the specific detailed structure of an imager serving as an example of the information processing apparatus according to the embodiment of the present invention will be described. FIG. 8 shows an example of the structure of an imager 500. The major processing blocks of the imager 500 include an imaging unit 510, a read/write unit 520, and a controller 530. Further, the imager 500 includes recording media 561 and 562, an operation input unit 541, a display unit 542 for presenting the GUI described in the above embodiment, and a USB connector 543 for establishing a USB connection.

The recording media 301 and 302 described with reference to FIG. 7 correspond to the recording media 561 and 562 shown in FIG. 8. The controller 305 shown in FIG. 7 corresponds to the controller 530 shown in FIG. 8. The display unit 304 shown in FIG. 7 corresponds to the display unit 542 shown in FIG. 8. The USB connector 303 shown in FIG. 7 corresponds to the USB connector 543 shown in FIG. 8.

The imaging unit 510 includes an optical block 511, a camera controller 512, a signal converter 513, an imaging signal processor 514, an audio input unit 515, and an audio signal processor 516. The optical block 511 includes therein a group of lenses for capturing an image of an object, a diaphragm adjusting mechanism, a focusing adjusting mechanism, a zoom mechanism, a shutter mechanism, a flash mechanism, and a hand-motion compensating mechanism. The camera controller 512 receives a control signal from the controller 530 and generates a control signal to be supplied to the optical block 511. The camera controller 512 supplies the generated control signal to the optical block 511 and controls zooming, shutter, exposure, or the like.

The signal converter 513 includes an image pickup device, such as a charge coupled device (CCD). An image through the optical block 511 is formed on an imaging surface of the image pickup device. In response to an image importing timing signal supplied from the controller 530 in response to a shutter operation, the signal converter 513 converts the object's image formed on the imaging surface into an imaging signal and supplies the imaging signal to the imaging signal processor 514.

On the basis of the control signal from the controller 530, the imaging signal processor 514 processes the imaging signal by performing gamma correction or auto gain control (AGC) and converts the imaging signal into an image signal serving as a digital signal. The audio input unit 515 collects sounds around the object at the time the image is captured. An audio signal from the audio input unit 515 is supplied to the audio signal processor 516. On the basis of the control signal from the controller 530, the audio signal processor 516 processes the audio signal by performing correction and AGC and converts the audio signal into a digital signal.

The read/write unit 520 includes an encoder/decoder 521, a buffer memory 522, and recording interfaces 523 and 524. The buffer memory 522 includes, for example, a synchronous dynamic random access memory (SDRAM), which is used as a work area for encoding or decoding a signal by the encoder/decoder 521. The encoder/decoder 521 has an encoding function of encoding and multiplexing the image signal, the audio signal, and additional recording information from the imaging unit 510 into compressed data. At the same time, the encoder/decoder 521 has a decoding function of separating and decoding the image signal, the audio signal, and the additional recording information from the compressed data. On the basis of the control signal from the controller 530, the encoder/decoder 521 further processes the image signal from the imaging signal processor 514 by performing automatic white balance control, exposure adjustment control, and enlargement control according to the digital zoom magnification.

The recording interfaces 523 and 524 receive the compressed data from the encoder/decoder 521 and write the compressed data on the recording media 561 and 562, respectively. The medium on which the data is to be written can be selected by the user. For example, the recording destination is determined under the control of the controller 530 on the basis of the setting information input from the operation input unit 541. The recording interfaces 523 and 524 read the compressed data from the recording media 561 and 562 and supplies the data to the encoder/decoder 521 or the controller 530.

The controller 530 outputs, via an input/output interface (I/F) 536, data read from the recording media 561 and 562 or data decoded by the encoder/decoder 521 to a PC or a printer serving as an external device connected thereto via a USB cable connected to the USB connector 543.

The controller 530 includes a central processing unit (CPU) 531 for performing various control programs; a read only memory (ROM) 532; a random access memory (RAM) 533; an operation input I/F 534 connecting to the operation input unit 541; a display controller 535 for controlling the displaying of the display unit 542 presenting the above-described GUIs; the input/output I/F 536 for inputting and outputting data using the USB connector 543; and a timing circuit 537 for measuring, for example, the imaging time. These elements of the controller 530 are interconnected by a system bus. User operation information on the display unit 542 presenting the GUI is input to the CPU 531 via the operation input I/F 534, and control based on the input information is thereby performed.

The controller 530 displays a setting screen serving as a GUI for setting the data output mode for outputting data via the USB connector 543 on the display unit 542 and controls the information processing apparatus on the basis of information input to the GUI. That is, the controller 530 displays, as a GUI to be displayed on the display unit 542, a function selection screen enabling the user to select both the recording medium serving as an output data source from which data is output via the USB cable and the USB function (PC mode or PictBridge mode) to be executed, namely, the GUI screen 105 described with reference to FIG. 2. On the basis of selection information input on the function selection screen, the controller 530 performs the setting processing to output data recorded on the selected recording medium in accordance with the selected USB function (PC mode or PictBridge mode).

The CPU 531 controls the overall processing of the controller 530 and uses the RAM 533 as a work area. The ROM 532 stores a program for controlling the imaging unit 510 and programs for controlling the reading/writing of the image signal and the audio signal, selection of the medium serving as the output data source from which data is output using the USB cable as described above, selection of the USB function, and setting of the mode.

The operation input I/F 534 includes, as the operation input unit 541, a plurality of keys including, for example, a zoom adjusting key, an exposure adjusting key, a shutter key, a moving image shooting key, and a display adjusting key for the display unit 542.

The display unit 542 connected to the display controller 535 includes, for example, a liquid crystal display (LCD) or the like. Under the control of the controller 530, the display unit 542 displays, besides the GUI for selecting the USB function as described above, the image signal from the imaging unit 510 or image signals read from the recording media 561 and 562. The display unit 542 is set as a user interface for receiving user operation information.

The input/output I/F 536 outputs data stored on the recording media 561 and 562 or decoded data to a PC or a printer serving as an external device connected thereto via the USB connector 543 and receives data from the external device. The timing circuit 537 generates time information indicating, for example, the second, minute, hour, day, month, and year as attribute information of the imaging data.

The present invention has been described in detail in the context of specific embodiments. However, obviously, it is possible for those skilled in the art to make modifications or alternatives without departing from the scope of the present invention. That is, the present invention has been disclosed by way of example, and the present invention should not be construed as limited to the embodiments. The scope of the present invention should be determined on the basis of the claims.

Although the processing example in which a USB cable is employed as means of communication between an information processing apparatus such as an imager and an external device such as a PC or a printer has been described in the above embodiment, the connection between the information processing apparatus and the external device such as the PC or the printer is not limited to the USB cable. The similar processing may also be performed in the case where other wired or wireless communication means is employed.

The series of processes described herein can be executed by hardware, by software, or by a combination of hardware and software. When the series of processes is executed by software, a program defining the processing sequences is executed by installing it on a memory of a computer embedded in dedicated hardware or on a general-purpose computer that is capable of executing various processes.

For example, the program may be recorded in advance on a recording medium such as a hard disk or a ROM. Alternatively, the program may be stored (recorded) temporarily or permanently on a removable recording medium such as a flexible disk, a compact disc read-only memory (CD-ROM), an MO disk, a DVD, a magnetic disc, or a semiconductor memory. Such a removable recording medium can be provided in the form of what is called packaged software.

Instead of installing the program from the above-described removable recording medium to the computer, the program may be transferred wirelessly from a download site to the computer, or transferred by wire to the computer via a network such as a local area network (LAN) or the Internet, so that the computer can receive the program transferred in this manner and install the program on an internal recording medium such as a hard disk.

The processes described in this specification may be executed in a time-series manner according to the description, or may be executed in parallel or individually depending upon the processing performance of an apparatus executing the processes or according to the necessity. The term "system" in this document is a logical set of a plurality of apparatuses and is not limited to the structure in which these apparatuses are housed in a single housing.

What is claimed is:

1. An information processing apparatus in a camera comprising:
    a plurality of removable data-recordable recording media;
    an operation unit configured to receive a camera operation;
    a communication unit configured to output data stored on the recording media to an external device; and
    a controller configured to display a function selection screen including a menu of selectable communication standards and selectable recording media on a display unit, the function selection screen being configured to receive a selection command specifying a communication standard corresponding to outputting of data to the external device as an output data mode and a recording medium, of the plurality of data-recordable recording media, as an output data source, the controller being configured to control the information processing apparatus in the camera based on the selection command received by the function selection screen via the operation unit,
    wherein the controller
        outputs, based on the selection command, data recorded on the selected recording medium to the external device via the communication unit in accordance with the output data mode,
        further displays, in response to receiving a selection to end the output of data on the selected recording medium, a selection screen having
            a terminate selection configured to terminate the output of data via the communication unit, and
            a change connection selection that displays, in response to being selected, the function selection screen to receive a new selection to change one of the previously selected output data source from which data is output via the communication unit and the previously selected output data mode, and outputs the data to the external device based on the new selection from the function selection screen,
    wherein, when the information processing apparatus in the camera communicates with the external device in accordance with the output data mode and the information processing apparatus in the camera is disconnected from the external device, the controller maintains the output data mode of the information processing apparatus in the camera set at a time the information processing apparatus in the camera was disconnected from the external device.

2. The information processing apparatus in the camera according to claim 1, wherein the function selection screen receives a selection command specifying the recording medium to serve as the output data source from which data is output and one of a mass storage mode and a print mode, and
    wherein the controller performs, based on the selection command, a setting operation to output the data recorded on the selected recording medium in accordance with one of the selected mass storage mode and the print mode.

3. The information processing apparatus in the camera according to claim 1, wherein the communication unit outputs data to the external device via a universal serial bus cable according to the universal serial bus standard, and
    wherein, when the universal serial bus cable is disconnected from the communication unit or the external device, the controller maintains the output data mode of the information processing apparatus in the camera set at a time the universal serial bus cable was disconnected.

4. The information processing apparatus in the camera according to claim 1, wherein the communication unit outputs data to the external device via a universal serial bus cable according to a universal serial bus standard, and
    wherein, when the universal serial bus cable is disconnected from the communication unit or the external device and the output data mode of the information processing apparatus in the camera set at a time the universal serial bus cable was disconnected was a mass storage mode, the controller maintains a state existing prior to the disconnection of the universal serial bus cable without transferring a right to access the recording medium set in the mass storage mode as the output data source from which data is output via the universal serial bus cable.

5. An information processing apparatus in a camera comprising:
    a plurality of removable data-recordable recording media;
    a communication unit configured to output data stored on the recording media to an external device; and
    a controller configured to display, in response to receiving a selection to end the output of data on a selected data-recordable recording media, a first selection screen on a display unit of the camera, the first selection screen including
        a termination selection configured to terminate output of data via the communication unit in response to being selected, and
        a change connection selection that displays, in response to being selected, a function selection screen to receive a selection to change one of an output data source from which data is output via the communication unit by changing a recording medium, of the plurality of data-recordable recording media, and an output communication standard, wherein
the data is output to the external device based on a selection from the function selection screen, and
when the information processing apparatus in the camera communicates with the external device in accordance with an output data mode corresponding to the communication standard and the information processing apparatus in the camera is disconnected from the external device, the controller maintains the output data mode of the information processing apparatus in the camera set at a time the information processing apparatus in the camera was disconnected from the external device.

6. An information processing apparatus in a camera comprising:
a plurality of removable data-recordable recording media;
a universal serial bus connector configured to output data stored on the recording media via a universal serial bus cable; and
a controller configured to display, in response to receiving a selection to end the output of data on a selected data-recordable recording media, a first graphical user interface (GUI) on a display unit of the camera, the first GUI having
a termination selection configured to terminate output of data via the universal serial bus cable in response to being selected, and
a change connection selection that displays, in response to being selected, a second GUI serving as a function selection screen to receive a selection to change one of an output data source from which data is output via the universal serial bus cable by changing a recording medium, of the plurality of data-recordable recording media, and a universal serial bus communication standard,
wherein the data is output to the external device based on a selection from the second GUI, and
when the information processing apparatus in the camera communicates with the external device in accordance with an output data mode corresponding to the communication standard and the information processing apparatus in the camera is disconnected from the external device, the controller maintains the output data mode of the information processing apparatus in the camera set at a time the information processing apparatus in the camera was disconnected from the external device.

7. An information processing apparatus in a camera comprising:
a plurality of removable data-recordable recording media;
a universal serial bus connector configured to output data stored on the recording media to an external device via a universal serial bus cable; and
a controller configured to output data to the external device via the universal serial bus connector based on a selection of a recording medium, of the plurality of data-recordable recording media as an output data source, and a selected communication standard as an output data mode,
wherein the controller locks, in response to the universal serial bus cable being disconnected from the universal serial bus connector, the selected output data mode of the information processing apparatus in the camera based on the selection that was set at a time the universal serial bus cable was disconnected.

8. The information processing apparatus in the camera according to claim 7, wherein, when the universal serial bus cable is disconnected from the universal serial bus connector and the communication standard of the information processing apparatus in the camera set at the time the universal serial bus cable was disconnected was a mass storage mode, the controller maintains a state existing prior to the disconnection of the universal serial bus cable without transferring a right to access a recording medium, of the plurality of data-recordable recording media, set in the mass storage mode as an output data source from which data is output via the universal serial bus cable.

9. An information processing method performed by an information processing apparatus in a camera, the method comprising:
storing, at a plurality of removable data-recordable recording media, data;
displaying, on a display unit of the camera, a function selection screen including a menu of selectable communication standards and selectable recording media, the function selection screen being configured to receive a selection command specifying a communication standard corresponding to outputting of data to the external device as an output data mode and a recording medium, of the plurality of data-recordable recording media, as an output data source;
controlling, at a controller, the information processing apparatus in the camera based on information received by the function selection screen;
outputting, at the communication unit, based on the selection command, data recorded on the selected recording medium to the external device in accordance with the selected communication standard;
displaying, on the display unit of the camera, a selection screen, in response to receiving a selection to end the output of data on the selected recording medium, having
a termination selection configured to terminate the output of data via the communication unit in response to being selected, and
a change connection selection that displays, in response to being selected, the function selection screen to receive a new selection to change one of the previously selected output data source from which data is output via the communication unit and the previously selected output data mode;
outputting, at the communication unit, the data to the external device based on the new selection from the function selection screen; and
maintaining, via the controller, when the information processing apparatus in the camera communicates with the external device in accordance with the output data mode and the information processing apparatus in the camera is disconnected from the external device, the output data mode of the information processing apparatus in the camera set at a time the information processing apparatus in the camera was disconnected from the external device.

10. The information processing method according to claim 9, wherein the function selection screen receives a selection command specifying the recording medium to serve as the output data source from which data is output and one of a mass storage mode and a print mode, and
wherein the controller controls, based on the selection command, the information processing apparatus in the camera to output the data recorded on the selected recording medium in accordance with one of the selected mass storage mode and the print mode.

11. An information processing method performed by an information processing apparatus in a camera, the method comprising:

storing, at a plurality of removable data-recordable recording media, data;

displaying, on a display unit of the camera, a function selection screen including a menu of selectable communication standards and selectable recording media, the function selection screen being configured to receive a selection command specifying a communication standard corresponding to outputting of data to the external device as an output data mode and a recording medium, of the plurality of data-recordable recording media, as an output data source;

controlling, at a controller, the information processing apparatus in the camera based on the selection command;

outputting, at a universal serial bus connector via a universal serial bus cable, data recorded on the selected recording medium to the external device in accordance with the selected communication standard; and displaying, on the display unit of the camera, a selection screen, in response to receiving a selection to end the output of data on the selected recording medium, having a termination selection configured to terminate the output of data via the communication unit in response to being selected, and a change connection selection that displays, in response to being selected, the function selection screen to receive a new selection to change one of the previously selected output data source from which data is output via the universal serial bus cable and the previously selected output data mode;

outputting, at the at a universal serial bus connector via a universal serial bus cable, the data to the external device based on the new selection from the function selection screen; and maintaining, via the controller, when the information processing apparatus in the camera communicates with the external device in accordance with the output data mode and the information processing apparatus in the camera is disconnected from the external device, the output data mode of the information processing apparatus in the camera set at a time the information processing apparatus in the camera was disconnected from the external device.

12. The information processing method according to claim 11, wherein the controller maintains, when the universal serial bus cable is disconnected from one of the universal serial bus connector and a device connected to the information processing apparatus in the camera via the universal serial bus connector and the mode of the information processing apparatus in the camera set at a time the universal serial bus cable was disconnected was a mass storage mode, a state existing prior to the disconnection of the universal serial bus cable without transferring a right to access the recording medium set in the mass storage mode as the output data source from which data is output via the universal serial bus cable.

13. An information processing method performed by an information processing apparatus in a camera, the method comprising:

storing, at a plurality of removable data-recordable recording media, data;

displaying, at a display unit of the camera and in response to receiving a selection to end the output of data on a selected data-recordable recording media, a selection screen including a termination selection configured to terminate output of data via the universal serial bus cable in response to be being selected, and a change connection selection that displays, in response to being selected, a function selection screen configured to receive a selection to change one of an output data source from which data is output via a universal serial bus cable by changing a recording medium, of the plurality of data-recordable recording media, and a universal serial bus communication standard, wherein the data is output to the external device at a universal serial bus connector via the universal serial bus cable based on the selection from the function selection screen; and maintaining, via the controller, when the information processing apparatus in the camera communicates with the external device in accordance with an output data mode corresponding to the communication standard and the information processing apparatus in the camera is disconnected from the external device, the output data mode of the information processing apparatus in the camera set at a time the information processing apparatus in the camera was disconnected from the external device.

14. An information processing method performed by an information processing apparatus in a camera, the method comprising:

storing, at a plurality of removable data-recordable recording media, data;

outputting, at a universal serial bus connector, data stored on the recording media via a universal serial bus cable according to a selected communication standard;

controlling, at a controller, the information processing apparatus in the camera to output data to the external device via the universal serial bus connector based on a selection of a recording medium, of the plurality of data-recordable recording media, as an output data source and a selected communication standard as an output data mode, wherein the controller locks, in response to the universal serial bus cable being disconnected from one of the universal serial bus connector and a device connected to the information processing apparatus in the camera via the universal serial bus connector, the output data mode based on the selection that was set at a time the universal serial bus cable was disconnected.

15. The information processing method according to claim 14, wherein when the universal serial bus cable is disconnected from one of the universal serial bus connector and a device connected to the information processing apparatus in the camera via the universal serial bus connector and the communication standard of the information processing apparatus in the camera set at the time the universal serial bus cable was disconnected was a mass storage mode, the information processing apparatus in the camera maintains a state existing prior to the disconnection of the universal serial bus cable without transferring a right to access the recording medium set in the mass storage mode as an output data source from which data is output via the universal serial bus cable.

16. A computer readable medium storing computer readable instructions thereon for an information processing apparatus in a camera, the computer readable instructions when executed by a computer cause the computer to perform a method comprising:

storing data in a plurality of removable data-recordable recording media;

displaying a function selection screen including a menu of selectable communication standards and selectable recording media, the function selection screen being configured to receive a selection command specifying a communication standard corresponding to outputting of data to the external device as an output data mode and a recording medium, of the plurality of data-recordable recording media, as an output data source;

controlling the information processing apparatus in the camera based on data received by the function selection screen; and outputting data recorded on the selected recording medium to the external device in accordance with the selection command;

displaying, in response to receiving a selection to end the output of data on the selected recording medium, a first selection screen having
a termination selection configured to terminate the output of data via the communication unit in response to being selected, and
a change connection selection that displays, in response to being selected, the function selection screen to receive a new selection to change one of the previously selected output data source from which data is output and the previously selected output data mode;
outputting the data to the external device based on the new selection from the function selection screen; and
maintaining, via the controller, when the information processing apparatus in the camera communicates with the external device in accordance with the output data mode and the information processing apparatus in the camera is disconnected from the external device, the output data mode of the information processing apparatus in the camera set at a time the information processing apparatus in the camera was disconnected from the external device.

17. The information processing apparatus in a camera according to claim 7, wherein the output data source is locked, in response to the universal serial bus cable being disconnected from the universal serial bus connector, based on the selection that was set at the time the universal serial bus cable was disconnected.

18. The information processing apparatus in a camera according to claim 7, wherein the output data mode is locked until a selection is received by the controller to terminate the output data mode or the universal serial bus cable is reconnected to the universal serial bus connector.

19. The information processing apparatus in the camera according to claim 1, wherein the selection screen only includes the terminate selection and the change connection selection.

* * * * *